May 31, 1960

V. WOUK 2,939,067

MEASURING CIRCUITS

Filed Oct. 20, 1958

VICTOR WOUK
INVENTOR

BY Ralph W. E. Bitner

ATTORNEY

United States Patent Office 2,939,067
Patented May 31, 1960

2,939,067

MEASURING CIRCUITS

Victor Wouk, New York, N.Y., assignor, by mesne assignments, to Sorensen & Company, Incorporated, South Norwalk, Conn., a corporation of Delaware Filed Oct. 20, 1958, Ser. No. 768,390

6 Claims. (Cl. 321—15)

This invention relates to a circuit for measuring, at ground potential, load currents in center tapped high voltage direct current power supplies. It has particular reference to means for measuring both the positive and negative halves of an alternating wave used to charge capacitors.

One of the most efficient and convenient circuits for the production of high direct current voltage is the full wave voltage doubler used with two rectifiers and two charging capacitors. However, this circuit has presented problems in current measurement. A direct current meter placed in the common return line will obviously show no reading because alternating current flows in this conductor. Placing a meter in each of the high voltage lines will measure the current but this connection is highly impractical for all voltages above 1,000 volts because the meters cannot be mounted safely and simply on a front panel and the meter connections will always present a hazard.

The solution to this problem involves a twin meter circuit using two meters, or a single meter which can be switched to either of two measuring circuits. Each measuring circuit includes a low voltage rectifier component which passes only one-half of the alternating wave. This circuit measures the total current and in addition indicates the balance or unbalance of the system.

One of the objects of this invention is to provide an improved high voltage D.C. power supply load current measuring circuit which avoids one or more of the disadvantages and limitations of prior art arrangements.

Another object of the invention is to measure the load current in a high voltage direct current power supply when one side of the meter is grounded.

Another object of the invention is to monitor the two halves of a voltage doubler power supply by measuring both the positive and negative halves of the alternating wave.

Another object of the invention is to provide a compensation circuit which balances out the currents due to distributed capacitance.

Another object of the invention is to provide a switching circuit whereby one meter may be switched from one circuit to another without breaking the flow of current.

The invention comprises a measuring circuit for a direct current full wave voltage doubler power supply and comprises a meter circuit connected between the center connection of two capacitors and one end of a transformer winding which supplies alternating current through two half-wave rectifiers. The meter circuit includes two branches connected in parallel, each branch including a direct current meter and a rectifier. The rectifiers are poled so as to pass currents of opposite polarity.

One feature of the invention includes a single direct current meter and a switching circuit which connects the meter in either the positive or negative return circuit for the measurement of either current.

A second feature of the invention includes a manually adjustable compensation circuit for each measuring branch to compensate for the capacitive currents caused by distributed capacity.

For a better understanding of the present invention, together with other and further objects thereof, reference is made to the following description taken in connection with the accompanying drawings.

Figure 1:
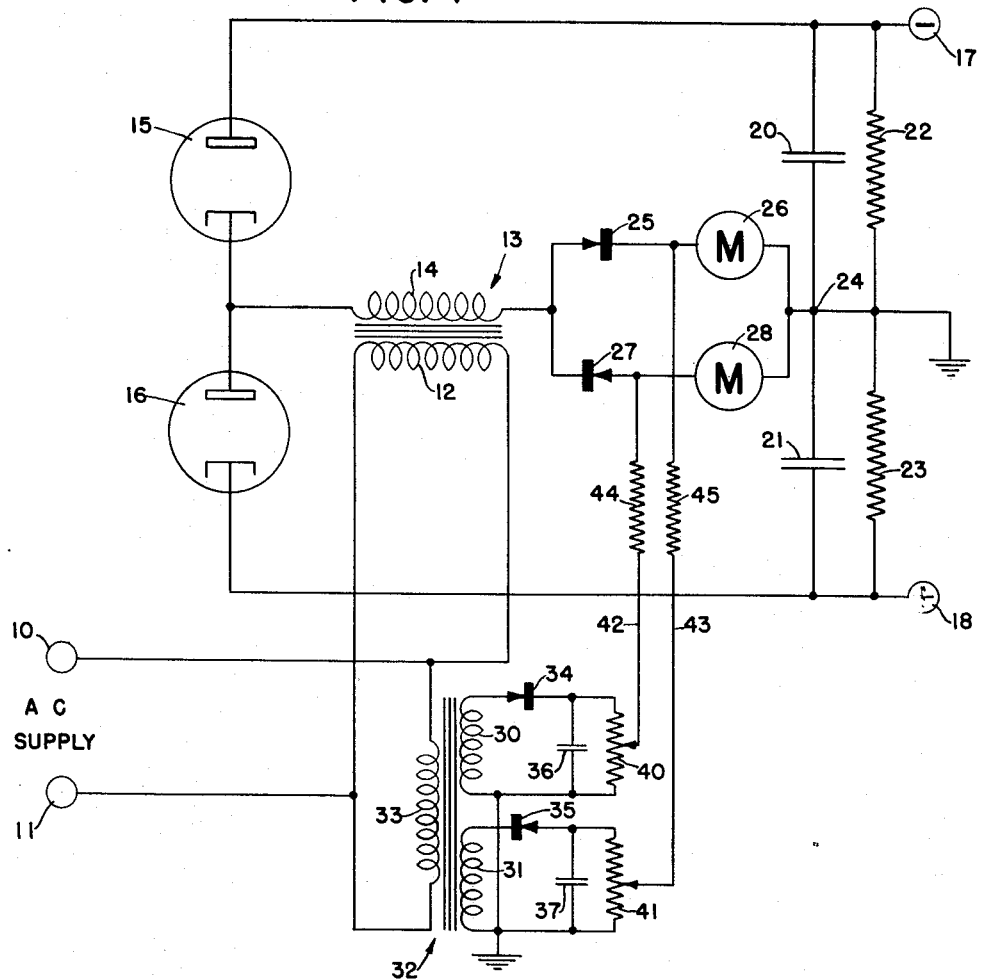
Fig. 1 is a schematic diagram of connections of the complete circuit including two meters and two compensating circuits.

Referring now to the figures, a pair of input terminals 10, 11, are to be connected to an alternating current source of supply. The input terminals are connected to a primary winding 12 of a step-up transformer 13 having a high voltage secondary winding 14. Rectifier diodes 15 and 16 are connected in series with one end of the secondary winding 14 and a pair of output terminals 17 and 18. Bridged across the output terminals are a pair of capacitors 20 and 21 which are charged by the half-wave pulses received through the rectifiers. The junction 24 between capacitors is connected, through a measuring circuit, to the other end of the secondary winding 14. The capacitors may each be bridged by a leakage resistor 22, 23, but these are not necessary. When the junction point 24 is grounded to make the circuit symmetrical, the load current metering problem arises. This type of high voltage, direct current power supply is well-known and is generally referred to as a voltage doubler circuit, center-tapped.

When the above described circuit is in operation, the current pulses during one-half cycle pass through rectifier 15 and charge capacitor 20 to the peak voltage of the secondary winding 14. The current pulses during the other half-cycles pass through rectifier 16 and charge capacitor 21 to the same voltage. These voltages are added and approximately twice the peak voltage of the secondary winding 14 is made available to a load at terminals 17 and 18.

If a single direct current meter were connected between junction 24 and the end of winding 14, no reading would be obtained because the current in this circuit is alternating and it would not show on a direct current meter movement. For this reason, and others, two branch circuits are employed, one including a rectifier 25 and a first meter 26, and a second including a rectifier 27 and a second meter 28.

A series of half-wave pulses, which charge capacitor 20, pass through rectifier 25 and register on meter 26. The other series of half-waves which charge capacitor 21 pass through rectifier 27 and register on meter 28. Each meter reading, taken alone, indicates the current from one of the terminals 17 or 18 to ground. The ratio of the currents indicates the degree of balance of the load circuit and gives some indication of the relative efficiency of the rectifiers 16 and 15.

It has been found that a measuring circuit as described above gives a reading when there is no load connected to terminals 17 and 18. This is due to the capacitive currents and leakage through resistors 22 and 23. To balance out these currents, which are usually of the order of 100 microamperes, two compensation circuits are provided. Each circuit includes a secondary winding 30, 31, on a transformer 32 having a primary winding 33 connected to input terminals 10, 11. Each compensation circuit also includes a rectifier 34, 35, a filter capacitor 36, 37, and a voltage divider 40, 41. One side of each secondary winding is grounded. The voltage dividers are adjustable so that varying voltages can be applied over conductors 42, 43, through resistors 44, 45, to the two branch meter circuits.

When the device is first set in operation, the load between terminals 17, 18, is disconnected and the voltage dividers are adjusted until each meter 26, 28, reads zero. Then the load is connected and the meter readings give the true load current.

Figure 2:
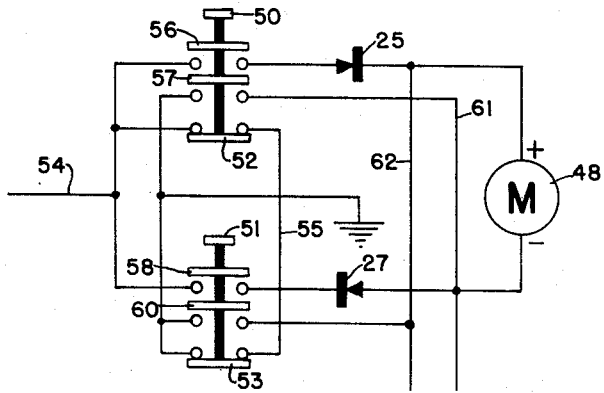
Fig. 2 is a schematic diagram of connections of an alternate measuring circuit using only a single meter.

It is not necessary to employ two meters as shown in Fig. 1. The alternate wiring diagram shown in Fig. 2 may be employed. A single meter 48 is provided with manually operated push switches 50 and 51. Each switch includes a pair of contacts, normally closed by a switch blade 52 and 53, which passes the current from transformer secondary over conductors 54 and 55 to ground, thereby avoiding the rectifier components and the meter. Each switch also includes two pairs of normally open contacts which are closed by switch blades 56, 57, and 58, 60.

When it is desired to measure the load current passing through diode rectifier 15, switch button 50 is operated and a circuit can then be traced from conductor 54, through switch blade 56, through rectifier 25 and meter 48, over conductor 61, switch blade 57, to ground. In a similar manner, the load current through diode rectifier 16 may be measured by operating push button 51 and completing a circuit which may be traced from conductor 54, through switch blade 58, through rectifier 27 and meter 48, over conductor 62, switch blade 60, to ground.

If both switches are operated at the same time, current pulses of both polarities pass through the meter and no reading is obtained.

For a power supply of 50 kilovolts, resistors 22 and 23 may have values of 100 megohms, resistors 40, 41, 44, and 45, may all have a value of 100,000 ohms, and the secondary voltage supplied by windings 30, 31, may be of the order of 6 volts.

The foregoing disclosure and drawings are merely illustrative of the principles of this invention and are not to be interpreted in a limiting sense. The only limitations are to be determined from the scope of the appended claims.

I claim:

1. A measuring circuit for measuring load currents in center-tapped voltage doubler direct current power supplies having two chargeable capacitors in series connection across a load comprising; a meter circuit connected between the junction of said capacitors and one end of an alternating current source which supplies direct current pulses through two half-wave rectifiers to the capacitors; said meter circuit including a single meter and two switching means each connected to a rectifier for selectively connecting the meter and either of the rectifiers to the meter circuit terminals, said rectifiers connected to said source and poled to pass currents of opposite polarity through said meter.

2. A measuring circuit for measuring load currents in center-tapped voltage doubler direct current power supplies having two chargeable capacitors in series connection across a load comprising; a single direct meter normally disconnected by a manually operable switching means; a first meter circuit including a first rectifier and the meter; and a second meter circuit including a second rectifier and the meter, said switching means adapted to connect either first or second meter circuits between one end of a source of alternating current and the junction of said two capacitors.

3. A measuring circuit for measuring load currents in center-tapped voltage doubler direct current power supplies comprising; a transformer having a primary for connection to a source of alternating current power and a secondary connected to two diode rectifiers and two series-connected chargeable capacitors; a single direct current meter normally disconnected by a manually operable switching means; a first meter circuit including a first rectifier and the meter; and a second meter circuit including a second rectifier and the meter, said switching means adapted to connect either first or second meter circuits between said transformer secondary and the junction of said two capacitors.

4. A measuring circuit as set forth in claim 3 wherein said first and second rectifiers are connected so as to pass currents of opposite polarity.

5. A measuring circuit as set forth in claim 3 wherein said first and second meter circuits are each connected to an adjustable compensating circuit which provides a current which compensates for distributed capacity currents.

6. A measuring circuit as set forth in claim 5 wherein said compensating circuits each include a source of alternating current, a rectifier, and an adjustable voltage divider.

References Cited in the file of this patent

UNITED STATES PATENTS

| | | |
|---|---|---|
| 1,729,753 | Stryker et al | Oct. 1, 1929 |
| 2,172,962 | Montgomery | Sept. 12, 1939 |
| 2,334,190 | Goldstine | Nov. 16, 1943 |
| 2,638,512 | Bessey | May 12, 1953 |
| 2,910,650 | Boddy | Oct. 27, 1959 |

FOREIGN PATENTS

| | | |
|---|---|---|
| 373,058 | Germany | Apr. 7, 1923 |

OTHER REFERENCES

"Radio Amateures' Worksheet," CQ, June 1945, pg. 27.
"Equipment Report," Audio Engineering, May, 1952, pg. 28.